United States Patent [19]

Coquerel

[11] Patent Number: 4,977,391

[45] Date of Patent: Dec. 11, 1990

[54] SAFETY DEVICE FOR A DISTRIBUTOR MEMBER CONNECTED TO A DISTRIBUTED PRODUCT TOTALIZING ELEMENT

[75] Inventor: Michel J. L. Coquerel, Calvados, France

[73] Assignee: Equipement Industriel Normand, Calvados, France

[21] Appl. No.: 452,039

[22] Filed: Dec. 18, 1989

[30] Foreign Application Priority Data

Dec. 18, 1988 [EP] European Pat. Off. ............ 88403239

[51] Int. Cl.$^5$ .............................................. G08B 19/00
[52] U.S. Cl. ..................................... 340/522; 340/500; 340/501; 340/825.06; 235/132 R; 235/60.48; 235/379

[58] Field of Search ........... 340/522, 500, 501, 825.06; 235/60.4, 60.48, 132 R, 132 E, 200 R, 201 FS, 128, 379

[56] References Cited

U.S. PATENT DOCUMENTS

| | | | |
|---|---|---|---|
| 3,855,536 | 12/1974 | Neuner | 340/522 |
| 4,020,488 | 4/1977 | Martin et al. | 340/522 |
| 4,401,976 | 8/1983 | Stadelmayr | 340/522 |

Primary Examiner—Donnie L. Crosland
Attorney, Agent, or Firm—Browdy and Neimark

[57] ABSTRACT

The measuring element and the totalizing element are each respectively connected to one of two operation sensors, supplying respectively an information on one input of a two input AND management circuit. The AND management circuit is connected to a control member for the distributor member in order to stop it in lack of information from at least one of the two operations sensors.

9 Claims, 1 Drawing Sheet

SAFETY DEVICE FOR A DISTRIBUTOR MEMBER CONNECTED TO A DISTRIBUTED PRODUCT TOTALIZING ELEMENT

FIELD AND BACKGROUND OF THE INVENTION

The present invention relates to a device providing for an automatic safety of the transmission between the measuring element of a distributor member and the totalizing element of a distributed product.

In all product distributors, the measuring element of the distributor member is connected to the totalizing element of the distributed product via a transmission connection of a mechanical type or the like.

In case for example of a gear unit kinematic chain transmission connection having at least one bevel gear and a flexible connection, an interruption in the transmission chain can occur when there is a break of some element of the chain such as when a peg or a key will break, or when the gear unit becomes unclutched. Then, the distributor member can continue distributing the product without the totalizing element being actuated and therefore without having the distributed product entered in the paying accounts. Likewise, it may occur that the totalizing element goes on rotating without any product being distributed.

A non exhaustive application of the safety device according to the invention relates to motor fuel distributors in which an un-hooking of the distributing gun is used to start operation of the pump of a distributor member. Then, this pump delivers a fuel toward the distributing gun and therefrom for example to an automobile tank via a measuring element and a flexible hose. A mechanical transmission connection of the hereabove type connects the measuring element to a totalizing element, the dynamic display of the quantity of product so distributed being provided by the totalizing element, possibly connected to a computer via a pulse supplier.

When the transmission connection between the measuring element and the totalizing element of such a fuel distributor is interrupted, a delivery of fuel can take place while the display given by the totalizing element remains inert. The result then is a delivery of fuel wich is not entered in the paying accounts and, consequently, possible frauds, losses of fuel, a possible pollution as well as stock management errors for example.

OBJECT OF THE INVENTION

The device according to the invention may obviously be applied to any type of distributor members and, for example, also to a banknote distributor in which the number of bank notes distributed could remain untotalized in absence of the safety device, according to the present invention.

The present invention eliminates the hereabove cited disadvantages by providing a device ensuring an automatic safety between the measuring element of a distributor member and a totalizing element for totalizing the product distributed by the distributor member.

SUMMARY OF THE INVENTION

According to the invention, the device providing for an automatic safety of a transmission connection between a measuring element of a distributor member and a totalizing element for totalizing a product distributed by said distributor member, is characterized in that the measuring element and the totalizing element are each respectively connected to an operation sensor taken among two operation sensors, with each of said two operation sensors supplying respectively an information on one input of a two input AND management circuit, said management circuit being connected to a control member for said distributor member, whereby stopping said distributor member in lack of information from at least one of the two operation sensors.

It is frequent that the totalizing element comprises a pulse supplier operating an electronic counter so as to provide a digital type displaying of the quantity and/or value of the distributed product. In that case, the pulse supplier is itself part of the operation sensor connected to the totalizing element, and the device according to the invention provides an automatic safety of the transmission connection between the measuring element and the pulse supplier.

Various other features of the invention will become more apparent from the following detailed description.

BRIEF DESCRIPTION OF THE DRAWINGS

An embodiment of the invention is shown by way of a non limiting example in the accompanying drawings, wherein.

DETAILED DESCRIPTION OF THE INVENTION

Figure 1:
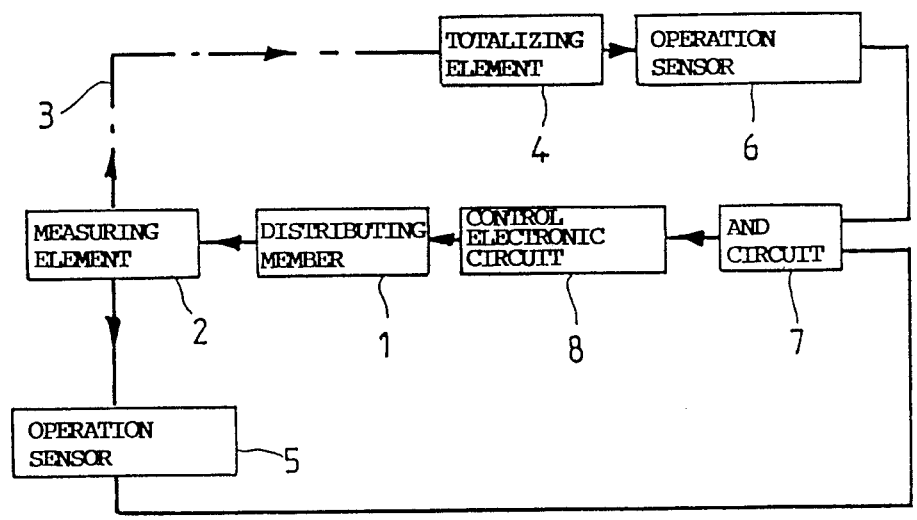
FIG. 1 is a systematic block diagram of the device according to the present invention.

Referring now to the drawings, FIG. 1 shows a distributor member 1 for distributing various products, connected to a measuring element 2. A transmission connection 3, of a mechanical type of the like, connects the measuring element 2 to a totalizing element 4. Thus, when a product is supplied by the distributor member 1 (which can be for example a pump delivering a petroleum product or a banking card station distributing banknotes), the measurement of the product distributed by the distribution member 1 is carried out by the measuring element 2 and transmitted by the connection 3 to the totalizing element 4 where the measurement is counted.

If however the transmission connection 3 is interrupted for some reason and, for example when the transmission connection 3 is a gear unit kinematic chain with a bevel gear and a flexible connection, if a peg or key becomes broken or if an unclutching of the gear unit occurs (with such an interruption being intentional or not), then the measuring element 2 does not transmit any more an information to the totalizing element 4. Thus, the product can continue to be supplied by the distributor member 1 without being counted by the totalizing element 4, which is actually no more driven by the transmission connection 3.

For avoiding the preceding disadvantages and, according to the invention, there is mounted, on the measuring element 3 as well as on the totalizing element 4, an operation sensor 5 and respectively 6.

The operation sensors 5 and 6 are each connected on their output side to a two input AND management circuit 7 which is in turn connected to the distributor member 1 via a control electronic circuit 8.

Thus, if the operation sensors 5 and 6 have not both received a detection information concerning the good operation of the element 3 or 4 on which they are respectively mounted, the AND management circuit 7 does not transmit any signal to the control electronic circuit 8 so that the distributor member 1 is for example no more supplied and stops the distribution of the product, the AND management circuit 7 having thus detected an anomaly of any type on the transmission connection 3.

On the contrary, if the operation sensors 5 and 6 detect that the totalizing element 4 operates at the same time as the measuring element 2, then the AND management circuit 7 transmits a signal to the control electronic circuit 8 which activates the distributor member 1, so that the distributor member 1 delivers the product. In this respect, the control electronic circuit 8 can include a pre-payment circuit ordering to the distributor member 1 to distribute a certain quantity of product following for example a payment previously made.

Figure 2:
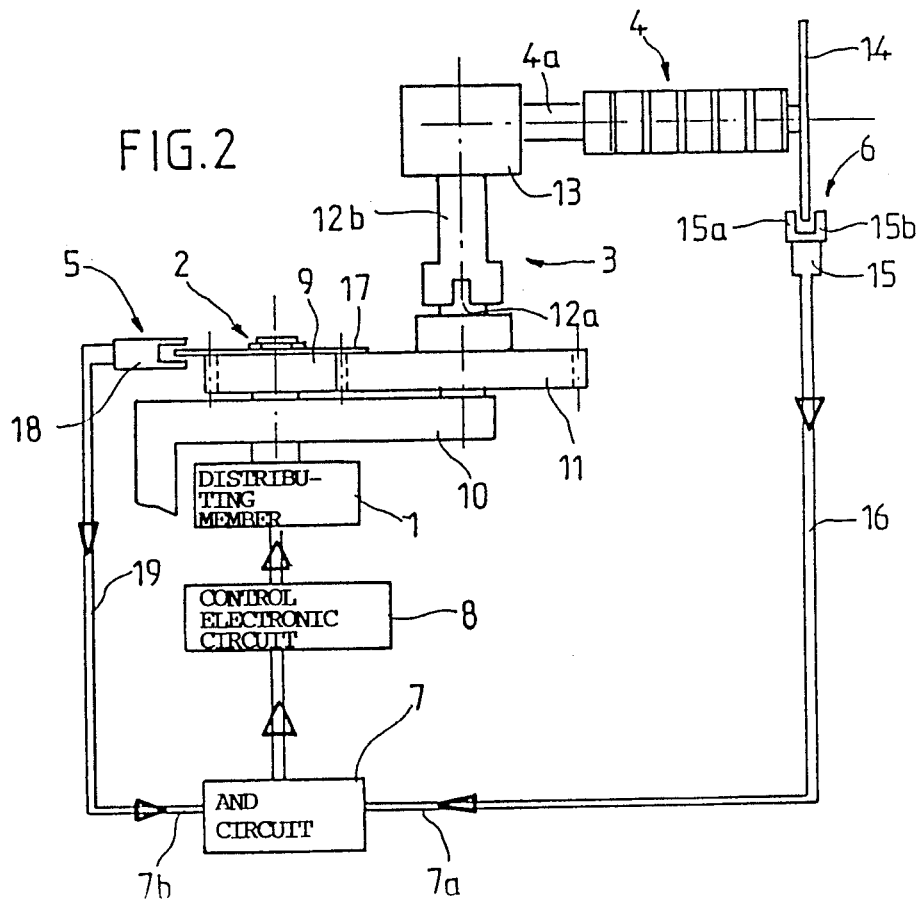
FIG. 2 shows an embodiment of the device.

In FIG. 2, the elements corresponding to those of FIG. 1 are designated by the same reference numerals.

Thus, FIG. 2 shows in a block form the distributor member 1 subjected to the AND function management circuit 7 via the control electronic circuit 8.

In FIG. 2, a pinion 9 of the measuring element 2 is mounted on a support 10 and is directly driven by the distributor member 1. The support 10 also carries a gear unit 11 provided for meshing with the pinion 9 and being part of the transmission connection 3 of FIG. 1, which, in the case shown, is a kinematic chain including a flexible connection 12a with a shaft 12b and a bevel gear 13.

The bevel gear 13 of the transmission connection 3 is connected to the totalizing element 4 which is shown in the shape of an assembly of mechanical counters the common axis 4a of which carries a disk 14 which is part of the operation sensor 6 sensing operation of the totalizing element 4.

In the embodiment shown, the disk 14 is made in the shape of a wheel similar to the wheels used in some writing machines, and includes a certain number of opaque sectors which, when the disk 14 rotates, cut off the light transmitted by a light transmitter 15a to a light receiver 15b of a photoelectric cell 15 to the output of which current pulses are thus produced.

It is obvious that it is possible to differently make the operation sensor 6 so that, when the totalizing element 4 operates and for example rotates, the operation sensor delivers a certain signal. For example, a Hall effect system can possibly be used, or a electromechanical system generating a certain current at output of a member similar to the photoelectric cell 15 when the disk 14 rotates or, in general, when the totalizing element 4 operates, whether it carries a disk or not.

An electric cable 16 is connected between output of the photoelectric cell 15 of the operation sensor 6 and a first input 7a of the two input AND management circuit 7. Information thus transmitted by the electric cable 16 is called "the main information", which is here the output current pulses from the photoelectric cell 15.

In a similar way, a disk 17 is mounted on the pinion 9 of the measuring element 2 and rotates when the distributor member 1 operates.

In the embodiment shown in FIG. 2, the disk 17 is similar to the disk 14 of the operation sensor 6 and includes also a wheel. However, contrary to the wheel of the disk 14, the wheel of the disk 17 includes a succession of electroluminescent diodes. Therefore, when the disk 17 rotates, a passage of the electroluminescent diodes past a captor 18 which is part of the operation sensor 5 generates at output of the captor 18 a so-called "checking information", in the form of light pulses. An optic fiber bundle 19 transmits the checking information to a second input 7b of the AND management circuit 7.

Although the checking information has been shown in the shape of a succession of light pulses and the main information in the form of a succession of electric pulses, it is obvious that the checking information as well as the main information can be of a luminous or electric type and, likewise, of the pulse or continuous type, and in this respect the operation sensors 5 and 6 can be of any appropriate types and can be identical or not according to needs.

It is clear from FIG. 2 that if the kinematic chain of the transmission connection 3 is interrupted for some reason, for example if a peg or a key included in the kinematic chain is broken, or if an unclutching of the gear unit 11 with respect to the pinion 9 occurs, then the main information is not transmitted to the input 7a of the AND management circuit 7.

Thus, if the measuring element 2 goes on measuring a certain quantity of product supplied by the distributor member, the operation sensor 5 will detect this supply and send the checking information to the input 7b of the AND management circuit 7. However, and since the AND management circuit 7 does not receive the main information on its input 7a, the AND management circuit 7 will supply no output signal to the control electronic circuit 8. The distributor member 1 will be then no more fed via the control electronic circuit 8 and will not supply the product any more. It is also possible to provide for the control electronic circuit 8 to cause in that case the closing of an electrovalve stopping the distribution of product by the distributor member 1.

While the totalizing element 4 of FIG. 2 has been shown with mechanical counters, it is obviously possible to omit at least in part the mechanical counters of the totalizing element 4 and form the totalizing element with a pulse supplier which is part of an electronic display computing member. The pulse supplier of the totalizing element 4 will then supply pulses similar to those coming from the photo cell 15 of the operation sensor 6 and which are applied to the input 7a of the AND management circuit 7, and this pulse supplier will therefore be a part of the operation sensor forming the main information mentioned above.

Then the device according to the invention will ensure an automatic safety of the transmission connection between the measuring element and the electronic display computing member by outputting from the AND management circuit a signal corresponding to the parallel operation of the measuring element and totalizing element.

The safety device according to the invention has been more particularly developed for its application to fuel distributors equipped with a computer and an electronic display, the effect of a supplying gun being used to start the operation of a pump supplying the fuel to the gun for filling the tank of an automobile via a measuring element and a flexible hose, the dynamic display being then provided by the computer via a pulse supplier as hereabove indicated.

In such an application, actually, and in the absence of a safety device between the mechanical transmission and the pulse supplier, a supply of fuel can take place while the display remains immobile and inert, the consequence being a distribution which is not counted and therefore various faults, a loss of fuel, possible pollutions as well as stock management faults (input and output of fuel) which is avoided by the safety device of the present invention.

However, the device according to the invention is not limited to the above fuel supplying application and could be used also for various other applications such as a food suppliers or an automatic distribution of banknotes by using banking cards.

I claim:

1. A device providing for an automatic safety of a transmission connection between a measuring element (2) of a distributor member (1) and a totalizing element (4) for totalizing a product distributed by said distributor member, wherein the measuring element (2) and the totalizing element (4) are each respectively connected to an operation sensor taken among two operation sensors (5 and respectively 6), with each of said two operation sensors supplying respectively an information on one input (7a, 7b) of a two input AND management circuit (7), said AND management circuit being connected to a control member (8) for said distributor member (1), whereby stopping said distributor member in lack of information from at least one of the two operations sensors.

2. The device as set forth in claim 1, wherein the totalizing element (4) comprises a pulse supplier which is part of the operation sensor (6) connected to said totalizing element (4).

3. The device as set forth in claim 1, wherein one at least of the totalizing element and measuring element includes a disk (14, 17), a captor element (15, 18) sensing rotation of the disk being provided so as to form said operation sensor.

4. The device as set forth in claim 1, wherein the transmission connection (3) is of a mechanical type and includes a kinematic chain incorporating a gear unit (11) connected to a pinion (9) of the measuring element (2), as well as a flexible connection (12a) and a bevel gear (13).

5. The device as set forth in claim 1, wherein the distributor member (1) is one amongst a liquid distribution pump, a food supplier and a banknote distributor.

6. The device as set forth in claim 1, wherein the AND management circuit (7) actuates an electrovalve stopping a distribution of product when there is a break in the transmission connection (3).

7. The device as set forth in claim 1, wherein the operation sensors (5, 6) are taken among electric and light type sensors.

8. The device as set forth in claim 1, wherein the control member comprises a control electronic circuit incorporated between the AND management circuit (7) and the distributor member (1).

9. The device as set forth in claim 8, wherein the control electronic circuit comprises a pre-payment circuit.

* * * * *

UNITED STATES PATENT AND TRADEMARK OFFICE
CERTIFICATE OF CORRECTION

PATENT NO. : 4,977,391

DATED : December 11, 1990

INVENTOR(S) : Michel J.L. COQUEREL

It is certified that error appears in the above-identified patent and that said Letters Patent is hereby corrected as shown below:

On the title page:

[30] Foreign Application Priority Data:

Delete "Dec. 18, 1988 [EP]", insert therefor
-- Dec. 19, 1988 [EP] --

Signed and Sealed this

Sixth Day of April, 1993

Attest:

STEPHEN G. KUNIN

*Attesting Officer*  *Acting Commissioner of Patents and Trademarks*